(No Model.) 4 Sheets—Sheet 2.

G. WESTINGHOUSE, Jr., & C. N. DUTTON.
FLUID METER.

No. 400,420. Patented Mar. 26, 1889.

Witnesses:
E. Newell
F. E. Gaither

Inventors,
George Westinghouse
Chauncey N. Dutton
by Darwin S. Wolcott
Atty

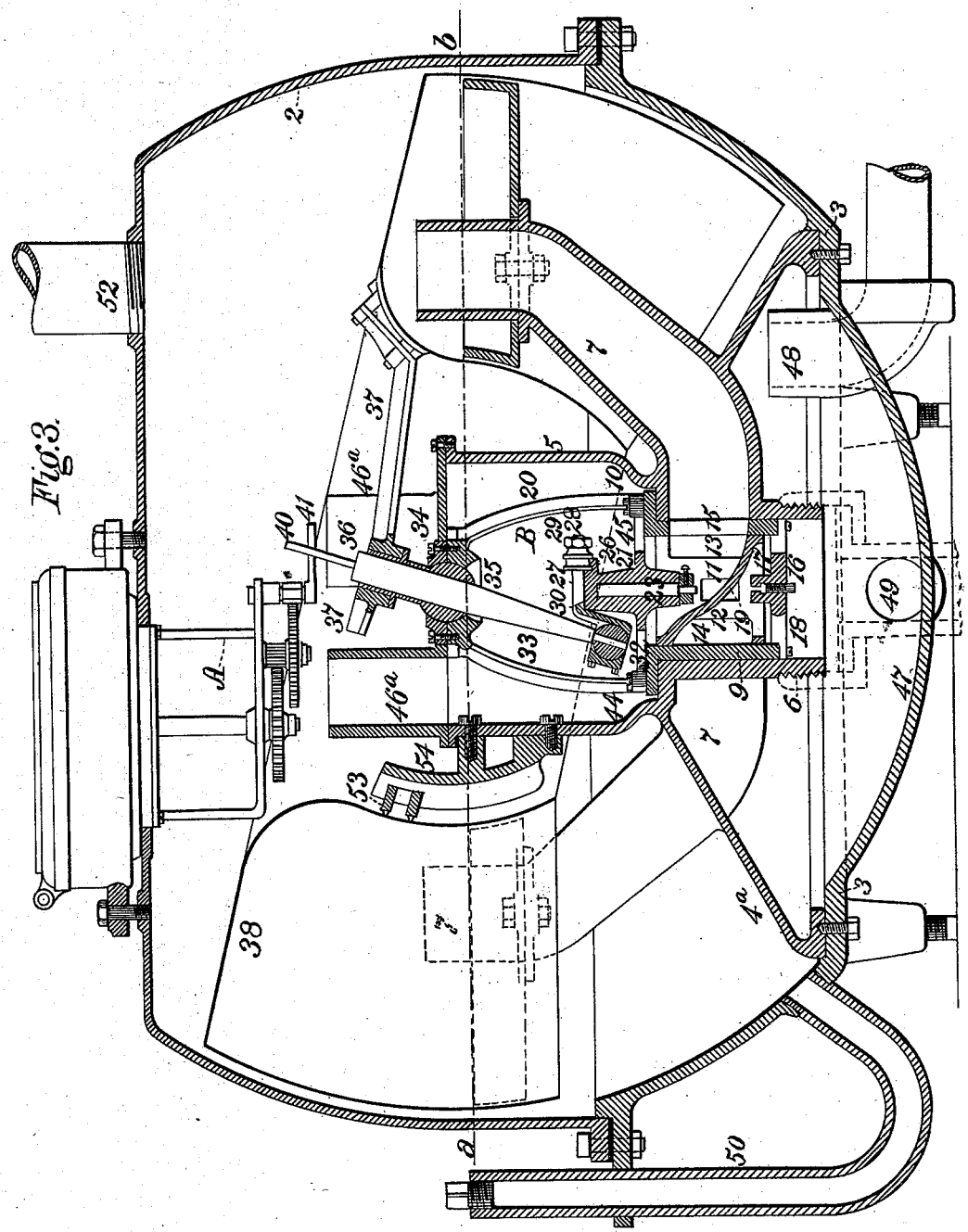

(No Model.) 4 Sheets—Sheet 4.

G. WESTINGHOUSE, Jr., & C. N. DUTTON.
FLUID METER.

No. 400,420. Patented Mar. 26, 1889.

WITNESSES:
E. Newell
F. E. Gaither

INVENTORS,
George Westinghouse Jr
Chauncey N. Dutton
by Darwin S. Wolcott
Att'y.

UNITED STATES PATENT OFFICE.

GEORGE WESTINGHOUSE, JR., AND CHAUNCEY N. DUTTON, OF PITTSBURG, PENNSYLVANIA.

FLUID-METER.

SPECIFICATION forming part of Letters Patent No. 400,420, dated March 26, 1889.

Application filed July 30, 1888. Serial No. 281,406. (No model.)

*To all whom it may concern:*

Be it known that we, GEORGE WESTINGHOUSE, Jr., and CHAUNCEY N. DUTTON, both citizens of the United States, residing at Pittsburg, in the county of Allegheny and State of Pennsylvania, have jointly invented certain new and useful Improvements in Fluid-Meters, of which improvements the following is a specification.

Our invention relates to devices for the volumetric measurement of fluids; and its object is to provide a meter in which only a comparatively small percentage of the pressure of the fluid to be measured is required to actuate the measuring devices, and in which the movement imparted to the measuring-receptacles is continuous and progressive, thereby avoiding the expenditure of power incident to a complete stop and change of direction, which is ordinarily involved in meters of the class in which reciprocating parts are employed.

To this end our invention consists in certain novel devices and combinations, hereinafter fully set forth.

Figure 1:
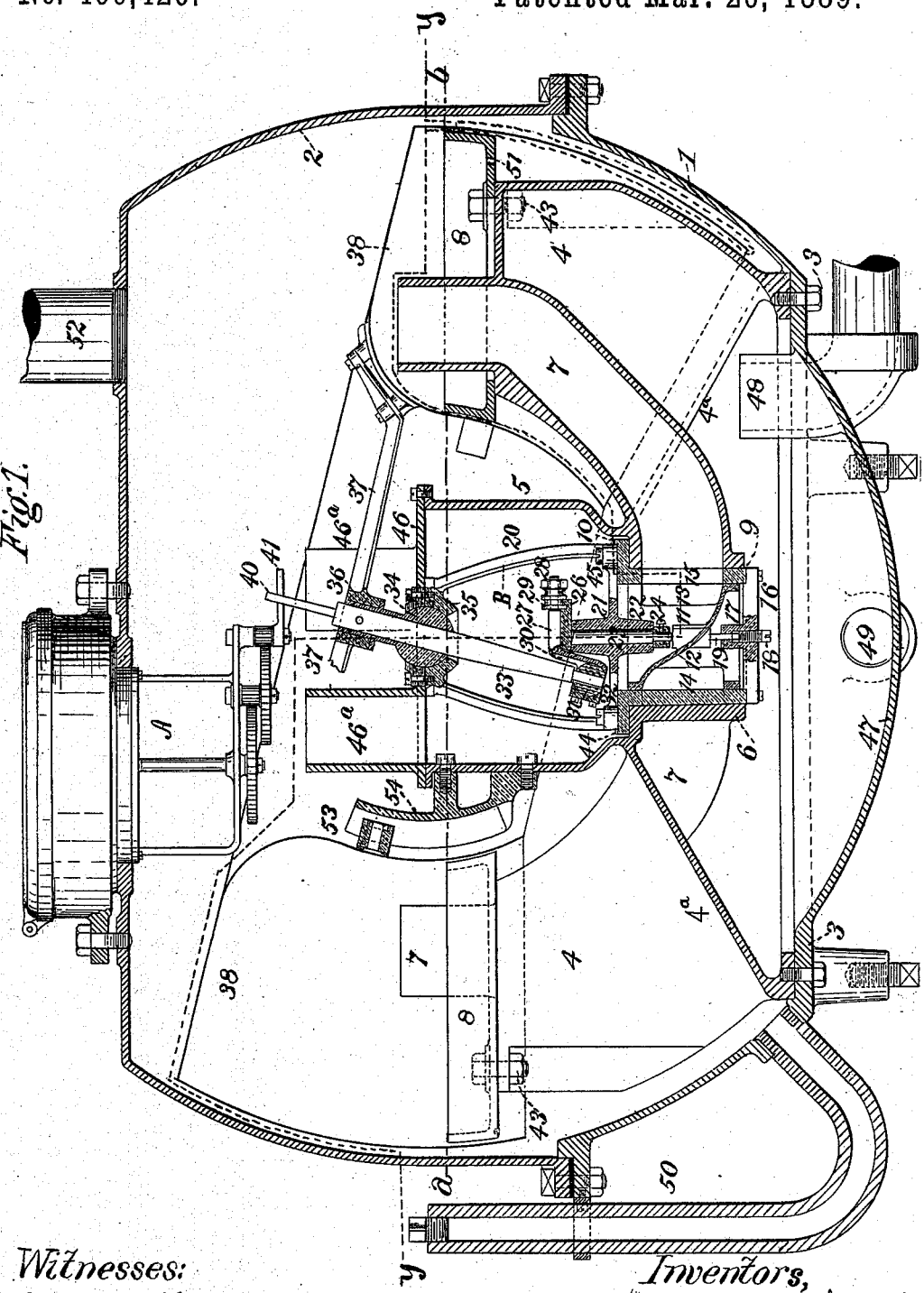
Figure 2:
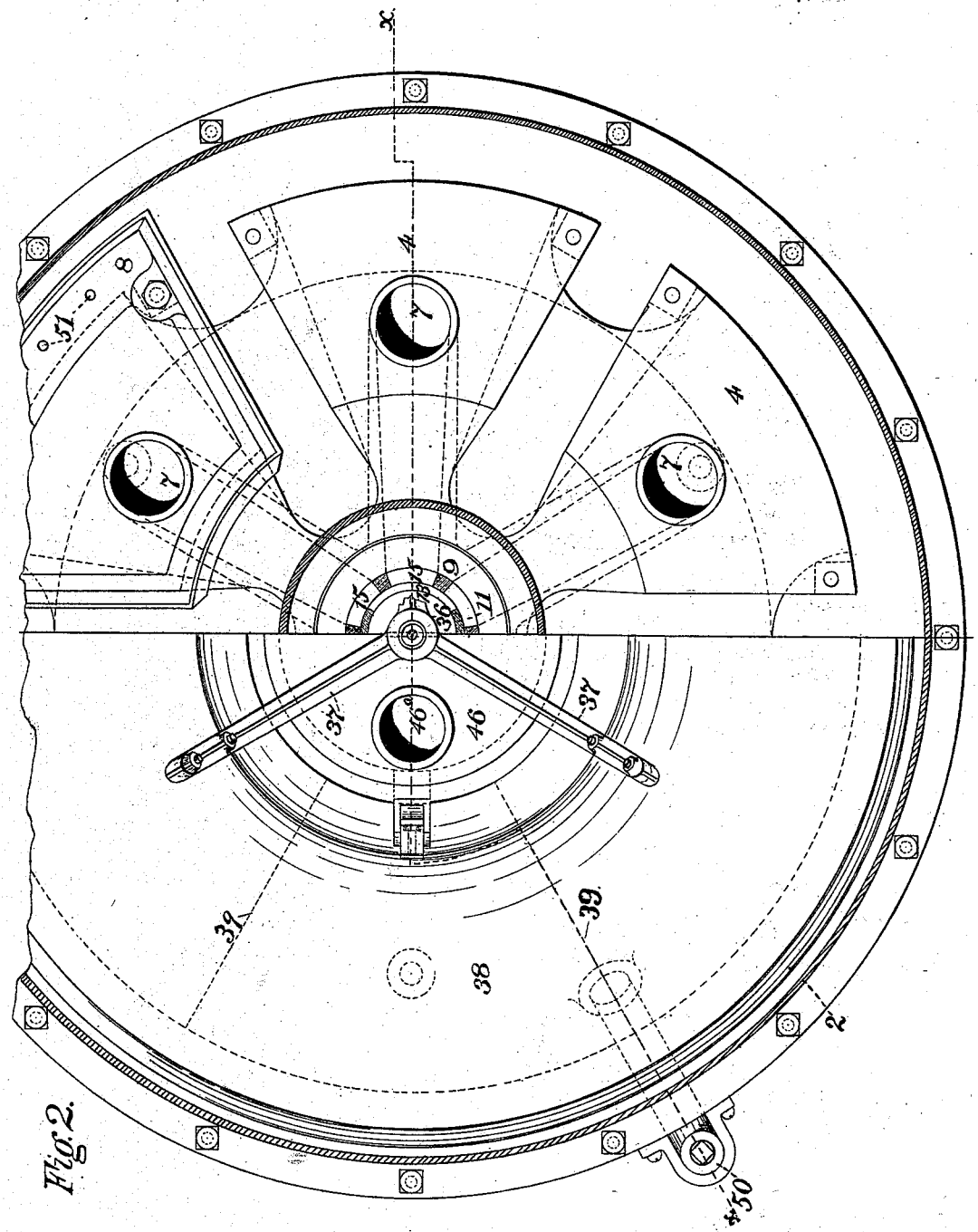
Figure 4:
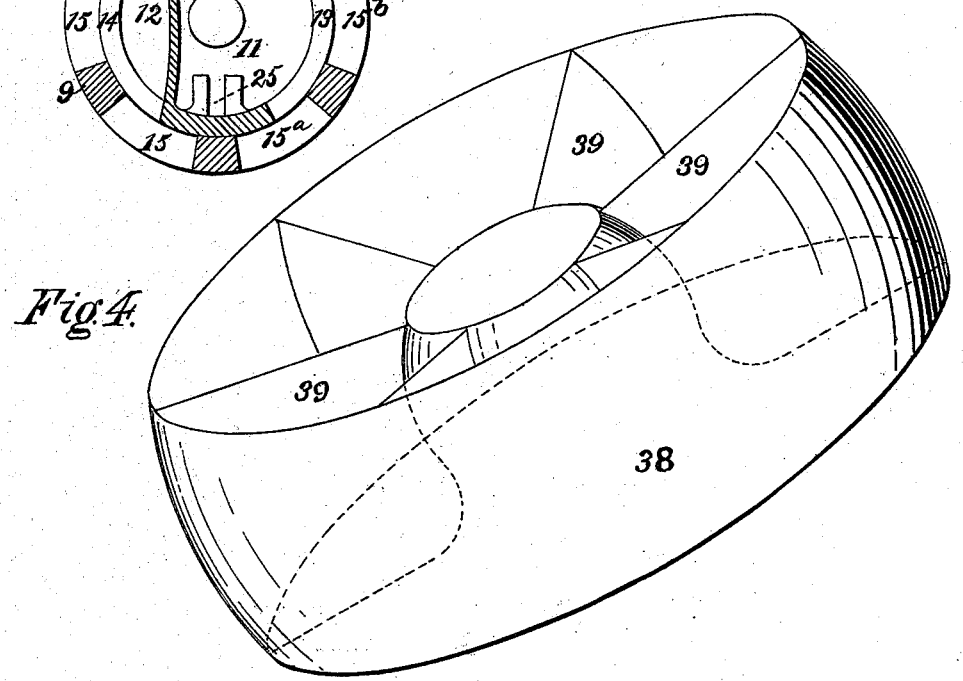

In the accompanying drawings, Figure 1 is a sectional elevation of a meter embodying our invention, the plane of section being indicated by the line $x\,x$ of Fig. 2; Fig. 2, a sectional plan at the line $y\,y$ of Fig. 1; Fig. 3, a sectional elevation at the same plane as that of Fig. 1, illustrating a modification; Fig. 4, a view in perspective of the measuring shell or vessel; and Figs. 5, 6, and 7, sectional views, on an enlarged scale, of the valve mechanism.

In the practice of our invention we provide a meter shell or case which is preferably nearly spherical in form, and is composed of two sections, 1 and 2, having outwardly-projecting flanges, whereby they may be secured together, on their meeting edges. The interior of the meter-case is divided into two compartments by a conical partition or diaphragm, $4^a$, which is secured to an annular face, 3, on the inside of the lower section, 1, of the case, and which, for the purpose of reducing the volume of sealing-fluid, is preferably provided with a series of upwardly-projecting bosses or displacers, 4, as shown in Figs. 1 and 2. The bosses 4, which are made hollow to reduce weight, are united one to the other by the intervening portions of the diaphragms, forming an integral structure. Their upper faces are substantially triangular in outline and their outer walls are outwardly curved in approximate correspondence with the curvature of the meter-case and measuring-shell, to be presently described, while their inner walls are made concave, so as to be practically concentric with the outer wall, as shown in Fig. 1. A central tube, 5, formed upon the diaphragm $4^a$, projects into the space above the same, and a concentric tube, 6, extends from the diaphragm into the space below the same for the reception of a charging and discharging valve, which will be hereinafter described. A series of tubes, 7, lead from the lower tube, 6, into the space above the diaphragm, the tubes 7 passing through and projecting above the tops of the displacers 4 when the latter are employed, as shown in Figs. 1 and 2.

Figure 7:
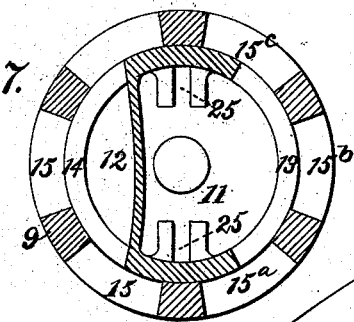

A tubular valve-casing, 9, is fixed within and concentric with the lower tube, 6, said valve-casing having openings or ports 15 in its sides, which register with the ends of the tubes 7, and being provided with a flange, 10, resting upon the tube 6, and serving to support the casing in position. A tubular valve, 11, is fitted to rotate within the casing 9, said valve being open at its ends and divided into two compartments by a partition or diaphragm, 12, extending diagonally across the valve, said partition being so shaped as to form two approximately equal compartments having ports 13 and 14 in the respective outer walls, each port being of a width approximately equal to twice the width of the ports 15 in the valve-case, as shown in Fig. 7. A cross-bar, 16, is secured to the under side of the valve-seat, said bar being provided with a central boss, 17, having a threaded opening for the reception of an adjusting-screw, 18, which supports a pin, 19, said pin in turn supporting the valve 11, and said screw serving to adjust and support the valve in position.

Figure 5:
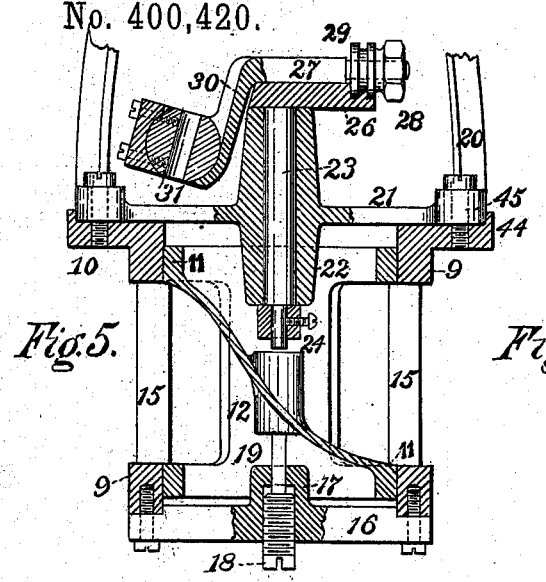
Figure 6:
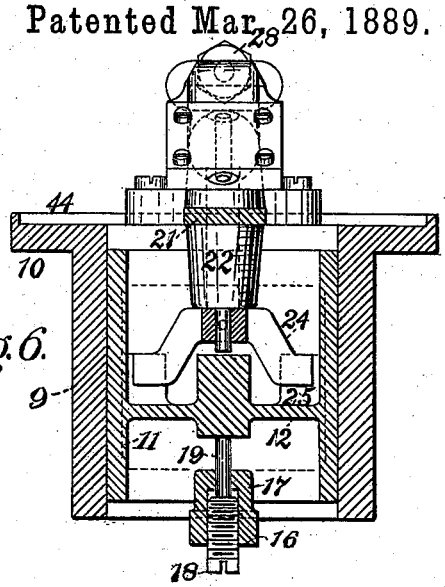

On the upper end of the valve-case casing is secured a frame, B, consisting of upwardly-extending arms 20 and horizontal arms 21, the latter serving to support a tubular bearing, 22, having its axis in line with the axis of the valve 11. Within the tubular bearing 22 is fitted a shaft, 23, having a cross-bar, 24, secured to its lower end, said cross-bar engaging at its end slots 25, formed on the inner walls of the valve, as shown in Figs. 5 and 6.

On the upper end of the shaft 23 is formed a cross-head, 26, provided with suitable guides or ways for the reception of a plate, 27, which is adjustable on the cross-head by means of a nut, 28, engaging a threaded stem on the plate, and having collars 29 engaging grooves in the cross-head, thereby preventing any longitudinal movement of the nut. This plate 27 is provided with an arm, 30, having a socket for the reception of a bearing, 31, which is preferably a ball having an axial opening for the reception of a pin, 32, on the lower end of the shaft 33, which is provided near its opposite end with an adjustable or ball bearing, 34, mounted in a socket, 35, preferably formed integral with the vertical arms 20 of the frame.

The shaft 33 has fixed upon it near its outer end a supporting-frame, which is preferably formed of a hub or sleeve, 36, for securing the frame to the shaft 33, and a series of radial arms, 37. This frame is secured to and supports a sheet-metal measuring shell or vessel, 38, in the form approximately of an annular spherical sector, which is divided into a series of measuring compartments or chambers by partitions 39, as shown in dotted lines in Fig. 1 and in perspective in Fig. 4. The open ends of the compartments of the shell 38 are constantly immersed in a suitable sealing-fluid, which is maintained as nearly as may be at a normal level—as, say, the line $a\ b$ in the meter-case—thus preventing the ingress and egress of fluid to be measured to and from the measuring-compartments except through the valve 11 and the channels controlled thereby. The bosses or displacers 4 correspond in number with the compartments of the shell 38, each of which moves above one of the displacers, the form of which is such as to permit free motion of the shell about its center, in the manner hereinafter described.

In order to reduce to as narrow limits as possible the variations of level of the sealing-fluid, due to the differences of pressure in the measuring-compartments in charging and discharging the same, a fixed equalizing-chamber, 8, is located in the case within each of said compartments, with its top and bottom respectively at or near the highest and lowest levels of the sealing-fluid. The peripheries of these chambers correspond in form with the transverse section of the measuring-compartments, and the chambers fit within the compartments as closely as is compatible with the free movement of the latter. The equalizing-chambers 8 are secured in position within the several measuring-compartments by suitably connecting them to the meter-case, as by bolting them to the displacers 4 or other fixed members of the structure.

In order to maintain a practically uniform level of sealing-fluid within and without the equalizing-chambers, small perforations 51 are formed in the latter. These perforations are made of such size that a change in level of the sealing-fluid outside of the chambers 8 due to variations of pressure within the meter or to movements of the measuring-shell 38 will not effect any material change in the fluid-level inside the chambers; but such changes of level of the sealing-fluid as are due to changes of volume, either by evaporation or by flooding, will be compensated for by the gradual flow of sealing-fluid through the perforations 51.

The shaft 33 is provided at its outer end with a pin, 40, which engages an arm, 41, connected to and adapted to actuate the indicating and registering mechanism A, said mechanism (which does not in and of itself form part of our invention) being of any suitable and well-known construction, and being connected to the cover or section 2 of the meter-case.

By reference to Fig. 1 it will be seen that the upper edge of the lower section, 1, of the inclosing-case of the meter is somewhat below the top of the bosses or displacers 4, thereby permitting access to the bolts and nuts 43, employed in securing the equalizing-chambers 8 to the displacers 4, it being necessary, on account of the shape of the measuring-shell 38 and by reason of the diameter of the wall of the lower section of the case at top being less than the diameter of a circle passing through the outer edges of the equalizing-chambers when in position, to permit of the equalizing-chambers being shifted radially while placing the measuring-shell in position, and to subsequently secure said chambers in position by the bolts and nuts 43 or other equivalent devices. In order to provide for the above-described adjustment of the equalizing-chambers and shell 38, an opening is formed in the under sides of the chambers for the passage of the tubes 7, and the outer corners of the bosses or displacers are undercut, thereby forming a flange through which the bolt 43 passes, as shown in Figs. 1 and 2.

By reference to Figs. 5 and 6 it will be seen that a small rim or bead, 44, is formed around the upper edge of the flange 10 of the valve-seat 9, thereby forming a guide or seat for the reception of the ring 45, to which the vertical and horizontal arms 20 and 21 of the frame B are secured. Thus it will be seen that all the movable parts of the meter are mounted and carried by the valve-seat. In order to prevent the access of the sealing-fluid in the meter to the operating mechanism, a cover, 46, having a central opening for the passage of the bearing 34, and with nozzles or tubes 46$^a$ for the escape of the fluid to be measured, is secured over the upper end of the central tube, 5, said cover bearing upon a flange formed around the upper end of the tube 5 and a flange on the bearing 35.

The sealing-fluid is introduced into the inclosing-case at a point above the face 3, to which the diaphragm 4ª is secured, as hereinbefore stated, by a bent tube, 50, whose upper end extends above the normal level indicated by the line $a\,b$ in the meter.

The cap or upper section, 2, of the inclosing-case is provided with a nozzle, 52, for the inflow of the fluid to be measured, and the lower section, 1, of said case is provided with a nozzle, 48, for the escape of the measured fluid. The inner end of the nozzle 48 projects up through a basin or sediment-chamber, 47, formed in the lower side of the section 1 of the case, for the reception of tar or other foreign material which may enter the meter, said basin being provided with a discharge-pipe, 49, as shown in Fig. 1.

In order to prevent any lateral movement of the measuring-shell 38, a projecting pin, 53, is secured thereto, said pin being arranged to engage a vertical groove in the guide 54, which is secured to the tube 5, as shown in Fig. 1.

In the operation of the meter the fluid to be measured enters through the nozzle 52, passes downwardly through the meter, is measured, and exhausts through the nozzle 48, or vice versa—that is to say, traverses in the opposite direction—as may be desired. Assuming it to enter the meter-case through the nozzle 52, it passes through the tubes 46ª and tube 5 to the valve 11. This valve, being, as before described, divided by the diaphragm 12 into inlet and exhaust sides and provided with corresponding ports, will in its revolutions register its inlet-port with two or more of the ports 15 in the valve-seat 9, to permit the measuring-compartments of the shell 38, with which these ports communicate, to be charged, and the exhaust-port of the valve registers with two or more of the ports 15 opposite those communicating with the inlet side of the valve, to permit the compartments of the shell communicating therewith to be exhausted. According, therefore, to the position of the valve, the fluid to be measured enters the measuring-compartments communicating with the inlet-port, charging said compartments, and by its excess of pressure tending to force them outward from the surface of the sealing-fluid and to force inward the compartments on the opposite side—i. e., those communicating with the exhaust-port of the valve. There is thus induced in the measuring-shell a tendency to oscillate from one side to the other. The crank 30, however, by maintaining the axis of the measuring-shell 38 always at a fixed angle with the vertical axis of the meter, prevents this direct oscillation and converts it into a progressive organized wabble or "libratory" movement of the measuring-shell, continuously revolving the shaft 23 and valve 11, so as to bring the inlet and exhaust ports of the latter successively in communication with the compartments of the measuring-shell 38 and controlling the movement of the same, as above described, so that each of its compartments will be charged and forced outwardly from the surface of the sealing-fluid and forced inwardly and exhausted, this successive action being progressive and continuous around the shell without rotation thereof, as the motion of the shell is effected about the center of the sphere of which it is a sector. The cubical contents of the compartments of the shell being known, the volume of fluid passing through the meter in a given time can be ascertained by observing the number of revolutions of the shaft 33 which are registered by the mechanism A, as before stated.

The action of each of the several compartments of the measuring-shell in being thus charged and forced outwardly from the surface of the sealing-fluid and thereafter forced inwardly and exhausted obviously tends to cause perturbation in the level of the sealing-fluid within such compartment, this fluid being depressed below its normal level when the compartment is charged and raised above its normal level when the compartment is discharged, thereby inducing variations from correct measurement. In order to reduce these variations to the lowest practicable limit, we provide equalizing-chambers 8, before described, the function of which is to fit as closely to the walls of the measuring-compartments as is consistent with the free motion thereof, to retain the main body of the sealing-fluid within the compartments at a practically uniform level while the compartment is measuring and prevent any rapid motion thereof at such times except in the narrow clearances between the equalizing-chamber and the walls of the measuring-compartment, thus reducing the error in measurement to such slight degree as not to practically impair the value of the meter.

The above-stated function of the equalizing-chambers might obviously be accomplished by a solid or closed block or case; but the employment of the hollow or chambered form enables the device to act additionally as a fluid-reservoir, containing a substantial volume of sealing-fluid, and the gradual flow of sealing-fluid into and out of the chambers admitted of by the small perforations 51 assists materially in maintaining the general level of the sealing-fluid within the limits necessary for effective and accurate measurement, and the small perforations prevent such rapid flow as would cause objectionable perturbations of level in the measuring-compartments during operation.

The walls of the measuring-shell 38 being very thin and moving through the sealing-fluid in their lines of least resistance—i. e., concentric with the shell—a low fluid-pressure will suffice to operate the meter, and the mechanism can be driven at a comparatively high speed.

The movement of the measuring-shell may be defined as a "libratory" (using the term as applied in astronomy) or continuous progressive wave-like movement, and the flow of fluid into and out of the meter is continuous and uninterrupted during operation.

As shown in Fig. 3, the displacers 4 may be dispensed with, the partition or diaphragm employed then being of continuous conical form, and, if desired, said partition or diaphragm, either with or without the displacers, may form the bottom of the inclosing-case, in which construction the pipe 48 is connected by a suitable coupling with the lower end of the tube 6, as indicated in dotted lines in Fig. 3.

We are aware that an annular cylindrical measuring-vessel divided into a series of compartments and adapted to oscillate successively in different transverse planes about a point within its axis has been proposed in a meter prior to our invention, and we therefore disclaim, broadly or separately considered, a measuring-vessel having such characteristic features of structure and movement.

We claim as our invention and desire to secure by Letters Patent—

1. In a fluid-meter, the combination of a substantially spherical inclosing-case provided with inlet and outlet pipes, an annular spherical sector measuring-shell divided into a series of separate compartments and adapted to receive a progressive wave-like movement about its center, and a valve connected to and actuated by the movements of the measuring-shell and controlling the flow of fluid to and from the several compartments thereof, substantially as set forth.

2. In a fluid-meter, the combination of an inclosing-case provided with inlet and outlet pipes, a measuring-shell composed of a series of compartments journaled on and adapted to successively oscillate about a common central bearing, and a valve connected to and actuated by the movements of the measuring-shell and provided with a partition and ports controlling the simultaneous admission of fluid to be measured into two or more adjacent compartments and its simultaneous delivery from two or more oppositely-arranged compartments, substantially as set forth.

3. In a fluid-meter, the combination of an inclosing-case, a diaphragm dividing said case into two compartments and provided with a central tube, a measuring-shell composed of a series of compartments adapted to oscillate successively about a common center in one of the compartments of the case, and a valve connected to and actuated by the measuring-shell and controlling the passage of fluid from one compartment of the case through the tube of the diaphragm into the measuring-compartments and from the measuring-compartments into the other compartment of the case, substantially as set forth.

4. In a fluid-meter, the combination of an inclosing-case, a diaphragm dividing said case into two compartments and provided with a central tube, a series of bosses or displacers projecting from the diaphragm into one of the compartments, a measuring-shell composed of a series of compartments which respectively surround the several bosses or displacers and are adapted to oscillate successively about a common center in the compartment of the case containing the same, and a valve connected to and actuated by the measuring-shell and controlling the passage of fluid from said compartment of the case through the tube of the diaphragm into the measuring-compartments and from the measuring-compartments into the other compartment of the case, substantially as set forth.

5. In a fluid-meter, the combination of a case adapted to contain a sealing-fluid, a series of measuring-compartments working within the case, and a series of equalizing-chambers, each fixed to the case and projecting within and fitting closely adjacent to the inner surface of one of the measuring-compartments, substantially as set forth.

6. In a fluid-meter, the combination of an inclosing-case, an annular measuring-shell divided into a series of compartments, a series of circularly-arranged displacers, each fixed to the case and projecting into one of the measuring-compartments, and a series of equalizing-chambers removably connected to the displacers, substantially as set forth.

7. In a fluid-meter, the combination of an inclosing-case in the form of a segment of a sphere and composed of two sections, a series of circularly-arranged displacers connected to the lower section of the case, and a series of equalizing-chambers connected removably to the displacers, the displacers and equalizing-chambers projecting above the upper face of the lower section of the case, substantially as set forth.

8. In a fluid-meter, the combination of an inclosing-case, a measuring-shell composed of a series of compartments journaled on and adapted to successively oscillate about a common central bearing, a series of tubes leading to the compartments and converging in a valve-casing concentric therewith, and a valve connected to and actuated by the measuring-shell and controlling the flow of fluid through the tube, substantially as set forth.

9. In a fluid-meter, the combination of a measuring-shell composed of a series of compartments arranged about a common center and having a progressive wave-like movement, a valve governing the flow of fluid to and from said compartments, and a guide or stop to prevent revolution of the measuring-shell around its center, substantially as set forth.

10. In a fluid-meter, the combination of an inclosing-case, a diaphragm arranged transversely of said case, pipes for conducting fluid to and from said case and connected thereto on opposite sides of the diaphragm, a valve controlling an opening through the diaphragm, and a sediment-chamber below the diaphragm, substantially as set forth.

11. In a fluid-meter, the combination of an inclosing-case provided with inlet and outlet pipes, a series of measuring-compartments, a valve controlling the flow of fluid to and from said compartments, mechanism connecting the measuring-compartments and valve, and a removable valve seat or support having the connecting mechanism attached thereto and removable therewith, substantially as set forth.

In testimony whereof we have hereunto set our hands.

GEO. WESTINGHOUSE, JR.
CHAUNCEY N. DUTTON.

Witnesses:
W. D. UPTEGRAFF,
DARWIN S. WOLCOTT.